(12) United States Patent
Reid

(10) Patent No.: US 11,448,326 B2
(45) Date of Patent: Sep. 20, 2022

(54) DOUBLE ACTING BOOST ARRANGEMENT

(71) Applicant: Halliburton Energy Services, Inc., Houston, TX (US)

(72) Inventor: Michael Adam Reid, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 30 days.

(21) Appl. No.: 16/927,563

(22) Filed: Jul. 13, 2020

(65) Prior Publication Data

US 2021/0080012 A1 Mar. 18, 2021

(51) Int. Cl.
| | | |
|---|---|---|
| *E21B 34/02* | (2006.01) |
| *E21B 34/04* | (2006.01) |
| *E21B 34/06* | (2006.01) |
| *F16K 5/06* | (2006.01) |
| *F16K 5/20* | (2006.01) |

(52) U.S. Cl.
CPC ............. *F16K 5/201* (2013.01); *E21B 34/02* (2013.01); *F16K 5/06* (2013.01); *E21B 2200/04* (2020.05)

(58) Field of Classification Search
CPC .......... E21B 34/02; E21B 34/04; E21B 34/06; E21B 2200/04; F16K 5/06; F16K 5/201
See application file for complete search history.

(56) References Cited

U.S. PATENT DOCUMENTS

| | | | | |
|---|---|---|---|---|
| 3,868,995 A | * | 3/1975 | Crowe ................ | E21B 34/101 166/324 |
| 3,901,321 A | * | 8/1975 | Mott .................... | E21B 34/106 166/373 |
| 4,293,038 A | | 10/1981 | Evans | |
| 4,603,742 A | * | 8/1986 | Wong .................. | E21B 34/106 166/374 |
| 8,151,887 B2 | * | 4/2012 | DCosta ................ | E21B 34/045 166/368 |
| 8,607,882 B2 | * | 12/2013 | Kalb ...................... | F16K 5/201 166/386 |
| 2016/0281461 A1 | | 9/2016 | Reid et al. | |
| 2018/0187514 A1 | * | 7/2018 | Inglis ................... | E21B 34/06 |

FOREIGN PATENT DOCUMENTS

EP 0055183 A1 6/1982

\* cited by examiner

*Primary Examiner* — Matthew R Buck
(74) *Attorney, Agent, or Firm* — Scott Richardson; Parker Justiss, P.C.

(57) ABSTRACT

A valve assembly, is presented that has a seating member is slidably coupled to a valve body adjacent a valve body bore and has a metal seat located on a seating end thereof that is engagable against a ball valve member. The seating member has a vent port located there through to allow fluid to flow into a fluid chamber within the ball housing. A first piston is slidably located between the seating member and the ball housing and located over the vent port, and a second piston is slidably located between the seating member and the ball housing and is located downhole from the first piston. Sealing members are located between the first and second pistons and engaged against the seating member.

20 Claims, 4 Drawing Sheets

DOUBLE ACTING BOOST ARRANGEMENT

CROSS REFERENCE TO RELATED APPLICATIONS

This application claims the benefit of U.S. PCT Application No. PCT/US2019/051408, filed on Sep. 17, 2019, entitled "DOUBLE ACTING BOOST ARRANGEMENT", which application is currently pending and is incorporated herein by reference in its entirety.

BACKGROUND

Operations performed and equipment utilized in conjunction with a subterranean production well often require one or more different types of valves. One such valve is a ball valve. A ball valve is a type of valve that uses a spherical ball valve member as a closure mechanism. The ball valve member has a hole there through that is aligned with the direction of flow when the valve is opened and misaligned with the direction of flow when the valve is closed.

Ball valves have many applications in well tools for use downhole in a wellbore, for example, as formation tester valves, safety valves, and in other downhole applications. Many of these well tool applications use a ball valve because their ball valve members can have a large through bore for passage of tools, tubing strings, and flow, yet may also be compactly arranged. For example, ball valves may have a cylindrical inner profile that corresponds to the cylindrical inner profile of the remainder of the tools that it associates with. During operations, the ball valve is subjected to extreme pressures, and as a result of these pressures, the exposed surface of the ball valve can become distorted.

BRIEF DESCRIPTION

Reference is now made to the following descriptions taken in conjunction with the accompanying drawings, in which.

DETAILED DESCRIPTION

Figure 1:
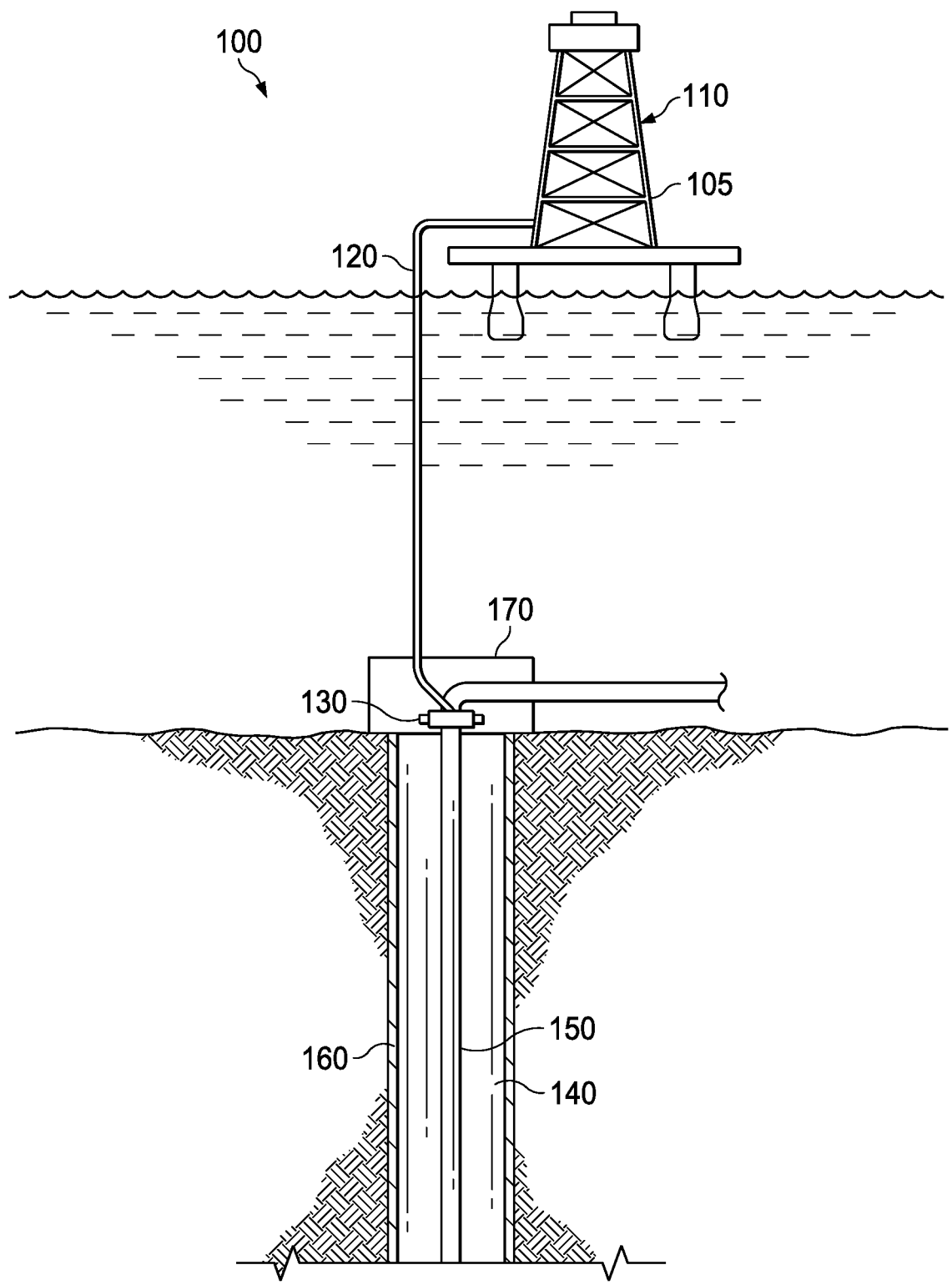
FIG. 1 illustrates a well system in which the valve assembly of the present disclosure may be employed.

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "above," "up," "upper," "upward," "uphole," "upstream," or other like terms, including their use in the claims, shall be construed as generally toward the surface of the formation; likewise, use of the terms "below," "down," "lower," "downward," "downhole," or other like terms shall be construed as generally toward the bottom, terminal end of a well, regardless of the wellbore orientation. Use of any one or more of the foregoing terms is meant to be used to provide a general orientation or arrangement of the components within the device and with respect to each other and shall not be construed to require the device to be located in a well bore or to denote positions along a perfectly vertical or horizontal axis. Unless otherwise specified, use of the term "subterranean formation" shall be construed as encompassing both areas below exposed earth and areas below earth covered by water, such as ocean or fresh water.

Ball valve assemblies are currently used in the oil and gas industry and often utilize a metal to metal (m-t-m) seal to ball sealing arrangement. A seating member is biased towards the ball by means of a spring that is typically located above, or uphole, of a boost piston, but the spring force is often insufficient alone to generate enough contact stress to maintain a gas tight seal over a range of pressures. Higher differential pressures require higher contact stresses to maintain a seal. Therefore, it is usual to incorporate a boost piston that has an upper and lower seal sized to be above and below the m-t-m seal point. This arrangement has the effect of causing the seating member to be pushed onto the ball with the applied wellbore pressure regardless of which direction the wellbore pressure is applied (above the ball or below). Though this arrangement works well and gives an increasing contact pressure, as the differential pressure increases it is subject to the loss of seal integrity, because depending on the direction of the applied pressure differential, the ball itself can be subjected to considerable loading, particularly when the pressure is applied from below (when the seat is located below the ball). In such instances, the large surface area within the m-t-m seal diameter is exposed to higher pressures, causing the ball to distort, resulting in a loss of seal integrity.

The present disclosure recognizes that it is advantageous to reduce the amount of ball surface area that is subjected to these higher pressures. To achieve this, the embodiments of this disclosure provide a dual piston arrangement that allows the m-t-m seal diameter to be moved closer to the inside diameter of the seating member, for example to minimize the exposed surface of the ball. The embodiments, as discussed herein, utilize two floating pistons positioned diametrically above the m-t-m seal diameter, thereby allowing the m-t-m seal diameter to be independent of the boost piston diameters. This allows for better customization of piston areas, giving better scope to adjust loads imparted onto the seating member to give optimal contact stress values. It also minimizes the exposed surface area of the ball, and as a consequence, minimizes ball distortion. An additional advantage associated with these embodiments is that the swaging forces on the seating member are reduced as well, due to the shallower angle that the seating member diameter makes with the ball's center surface. Referring to FIG. 1, depicted is a well system 100 including an exemplary operating environment in which the apparatuses, systems and methods disclosed herein may be employed. The well system 100, in the embodiment shown in FIG. 1, includes a rig 105 (e.g., intervention or servicing rig) located on an offshore platform 110. A valve assembly 130, such as a safety valve, is operatively connected to the offshore platform 110 via fluid/electrical connection 120. By way of convention in the following discussion, though FIG. 1 depicts a vertical wellbore, it should be understood by those skilled in the art that embodiments of the apparatus according to the present disclosure are equally well suited for use in wellbores having other orientations including horizontal wellbores, slanted wellbores, multilateral wellbores or the like. While the fluid/electrical connection 120 may include one or both of a fluid connection and/or electrical connection, in many embodiments consistent with the disclosure, the fluid/electrical connection 120 provides only a fluid connection (e.g., a hydraulic open line and a hydraulic closed line). An annulus 140 may be defined between walls of well 160 and a seal conduit 150. Wellhead 170 may provide a means to hang off and seal conduit 150 against well 160 and provide a profile to latch a subsea blowout preventer to. Seal conduit 150 may be coupled to wellhead 170. Seal conduit 150 may be any conduit such as a casing, liner, production tubing, or other tubulars disposed in a wellbore. Although the well system 100 is depicted in FIG. 1 as an offshore well, one of ordinary skill should be able to adopt the teachings herein to any type of well including onshore or offshore.

The fluid/electrical connection 120 may extend into the well 160 and may be connected to the valve assembly 130. The fluid/electrical connection 120 may provide actuation and/or de-actuation of the valve assembly 130. Actuation may comprise opening the valve assembly 130 to provide a flow path for wellbore fluids to exit the well 160, and de-actuation may comprise closing the valve assembly 130 to close a flow path for wellbore fluids to exit the well 160.

The valve assembly 130 may be interconnected to conduit 150. In one embodiment, the valve assembly 130 is located above the well 160, as is shown in FIG. 1. In other embodiments, the valve assembly 130 may be positioned in the well 160. As described in more detail below, the valve assembly 130, in accordance with the principles of the disclosure, includes a valve body having a ball housing with a valve body bore. The ball housing is coupled to a ball housing sub-assembly, which form the outer surface of the valve assembly. A ball valve member having a bore there through is located in the ball housing for selective rotation between valve open and valve closed positions to control flow through the valve assembly. A seating member is slidably coupled to the valve body adjacent the valve body bore and has a metal seat located on a seating end thereof that is engagable against the ball valve member. The seating member also has a vent port located through it to allow fluid to flow into a fluid chamber within the ball housing. A first piston is slidably located between the seating member and the ball housing and located over the vent port, and a second piston is slidably located between the seating member and the ball housing and is located downhole from the first piston. Sealing members are located between the first and second pistons and are engaged against the seating member.

Figure 2:
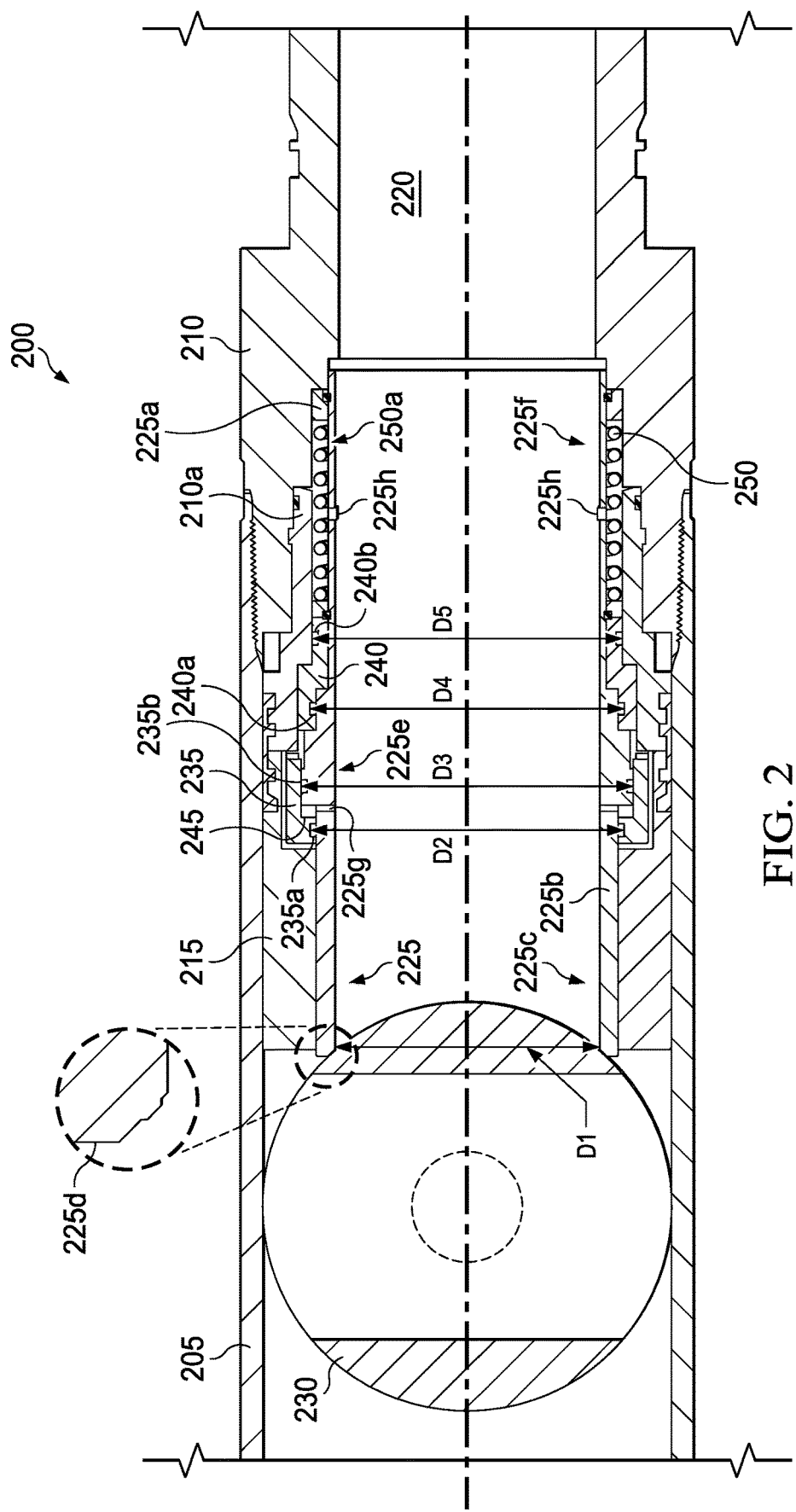
FIG. 2 is a cross section view of one embodiment of the valve assembly of the present disclosure.

Turning to FIG. 2, illustrated is a cross section view of one embodiment of a valve assembly 200 provided by the present disclosure. In this embodiment, the valve assembly 200 comprises a cylindrical ball housing 205 coupled to a sub-assembly 210, and a ball cage 215. The valve assembly 200 has a bore or passageway 220 that extends through it. A seating member 225 is slideably captured within the passageway 220 by a retaining ring 225a. In the illustrated embodiment, the seating member 225 is a cylindrical, hollow tube that has an interior diameter (ID) 225b that is exposed to the passageway 220 and through which well fluids can flow. When pressures are applied against the valve assembly, a seating end 225c of the seating member 225 engages a ball valve 230. As shown in the enlarged area, a m-t-m seat 225d of the seating member 225 engages the ball valve 230. The m-t-m seat 225d may be of known design, which is typically machined as a shoulder area on the end of the seating end 225c, the perimeter of which defines a diameter of the m-t-m seat 225d. In the embodiments of the present disclosure, the m-t-m seat 225d may be positioned near or at the ID 225b of the seating member 225. This location flexibility of m-t-m seat 225d is in contrast to known designs where the m-t-m seat is necessarily located in the center of the end thickness of the seating member. For reasons discussed below, the location of the m-t-m seat in current devices is necessarily fixed.

In view of the overall configuration of the embodiments of the present disclosure, the m-t-m seat 225d may be located nearer to or adjacent to the ID 225b (i.e., between the center of the thickness of the seating member 225 and the ID 225b), and in some embodiments, the m-t-m seat 225d may be located at the ID 225b. Being able to move the m-t-m seat 225d closer to the ID 225b of the seating member 225 provides the advantage of reducing exposed surface area of the ball valve 230 to high pressures, particularly from below, which results in less distortion of the ball valve 230, and thereby provides improved m-t-m seal integrity.

The seating member 225 includes features that are not present in current seating members. For example, seating member 225 includes a thicker portion 225e located between the seating end 225c and an oppositely disposed terminal end 225f, as shown. In one embodiment, the thicker portion 225e is located approximately in the center of the seating member 225, as generally shown. However, in other embodiments, the thicker portion 225e may be located off-center of the seating member 225. As mentioned above, the presence of the thicker portion 225e is in contrast to known seating member designs where the middle section typically is a thin walled section, which is dictated by design and that has a thickness that is less than the seating end section. The thickness of seating end 225c is less than that of the thicker portion 225e and may be of a standard thickness, according to design specifications, while the terminal end 225f has a thickness that is thinner than the seating end 225c, as generally seen in FIG. 2.

The presence of the thicker portion 225e is a distinct advantage over current designs. The thicker portion 225e provides sufficient structural strength to allow the m-t-m seat 225d to be moved nearer the ID 225b of the seating member 225, thereby reducing the distortion of the ball valve 230. As noted above, moving the m-t-m seat closer to the ID of the seating member in known designs is not an option because current designs include a centralized thin wall section. Moving the m-t-m seat toward the ID of the seating member in such devices would increase pressure on the thin wall section to such an extent that it would cause it to collapse and result in catastrophic failure of the valve assembly. Moreover, moving the m-t-m seal would position its diameter below the seals of the piston, thereby reducing or negating the boost effect of the piston. Making the thin wall thicker in current designs is also not an option because this would change the positions of the piston's seals and causing the m-t-m seat to no longer be between the seals, which in turn, would diminish the boost effect of the piston.

Embodiments of the valve assembly 200 further include two pistons, an upper or uphole piston 235 and a lower piston 240 located downhole from the upper piston 235. The pistons 235, 240 are slidably captured within slots located within the valve assembly 200 and are at least partially located between the ball cage 215 and the seating member 225. In contrast to current seating members, the seating member 225 has a vent port 225g located through it that allows fluid to move from the passageway 220 and into a chamber 245 in which the upper piston 235 is located. The vent port 225g allows pressure from the passageway 220 to enter the chamber 245 and exert operative pressures on the upper and lower pistons 235 and 240. The upper and lower pistons 235 and 240 include seals 235a, 235b, and 240a and 240b, respectively, which in one embodiment may be elastomeric "0" ring seals. Given that FIG. 2 is a cross section view, it should be understood that the seals 235a, 235b, and 240a and 240b may extend around the diameter of the passageway 220. As such, seal 235a forms a seal between the piston 235 and the seating end 225c of the seating member 225, and seal 235b forms a seal between the piston 235 and the thicker portion 225e of the seating member 225. Seal 240a forms a seal between the lower piston 240 and the thicker portion 225e of the seating member 225, and seal 240b forms a seal between the lower piston 240 and a coupling member 210a of the sub-assembly 210. As a result, the m-t-m seat 225d and the seals 235a, 235b, and 240a and 240b have seal diameters D1, D2, D3, D4, and D5 respectfully, across the passageway 220.

The valve assembly 200 further comprises a spring 250. However, unlike the current devices, the spring 250 can be located downhole from or below the pistons 235 and 240, and may have an additional vent port 225h located through the terminal end 225f of the seating member 225. The spring 250 is located within a spring chamber 250a and between the thin terminal end 225f of the seating member 225 and the sub-assembly components 210 and 210a. The spring 250 can be located over this thin terminal end 225f because there is no pressure differential across it due to the presence of the vent port 225h. The spring provides an additional biasing force against the lower piston 240, and the vent port 225h allows pressure to enter the spring chamber 250a and act on the lower piston 240.

Figure 3:
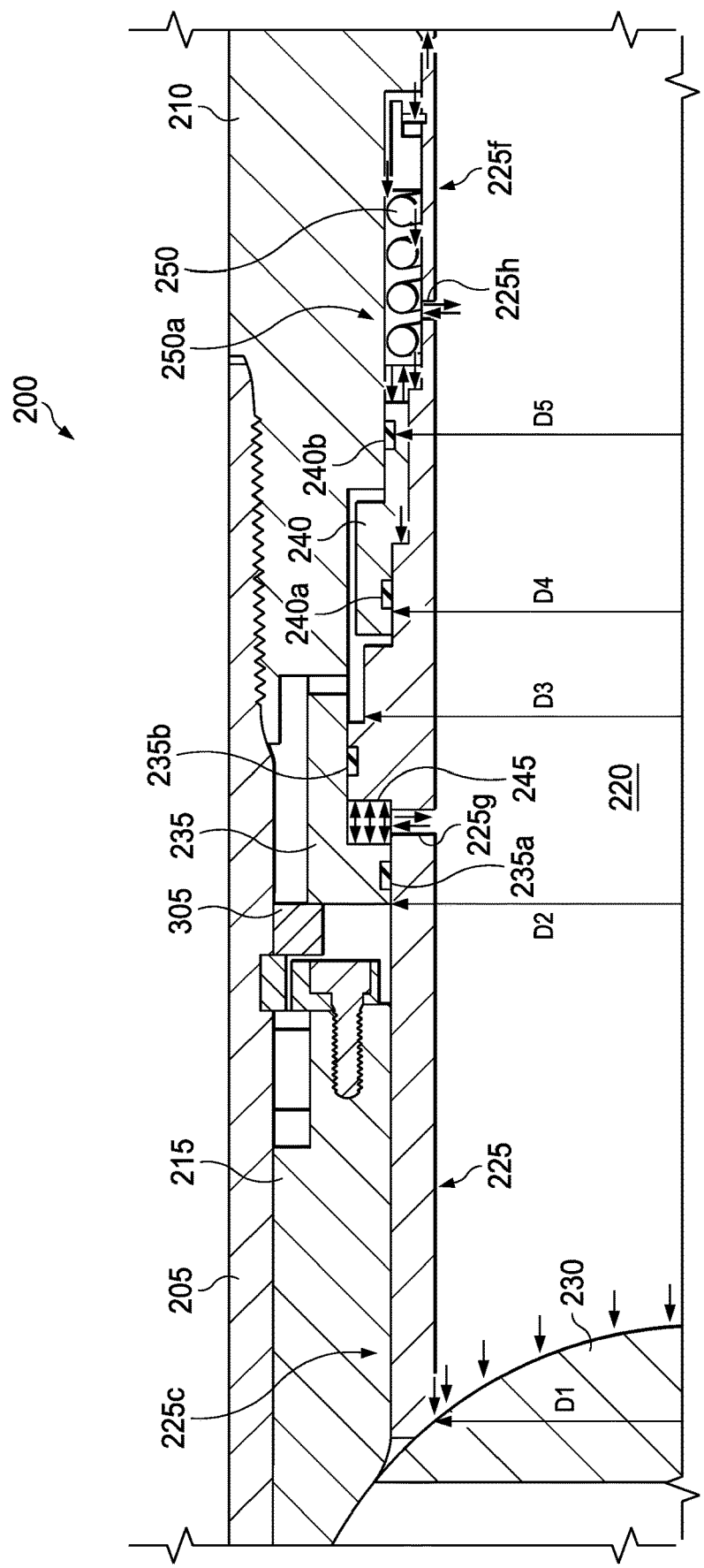
FIG. 3 is a cross section view of another embodiment of the valve assembly of the present invention illustrating the downhole pressures that can be exerted against the ball valve.

FIG. 3 illustrates another embodiment of the valve assembly 200 of FIG. 2, wherein similar components are designated with the same reference numbers. FIG. 3 illustrates the valve assembly 200 under pressure from below or downhole within the passageway 220. The directional arrows illustrate pressure acting on the ball up to D1. The pressure acts against seal 235a and piston 235 through vent port 225g and chamber 245. The pressure pushes the piston 235 to the left and towards the ball valve 230, until it stops against stop 305. As a result, the seating member 225 experiences a force tending to push it away from the ball valve 230. However, this is counteracted by a greater force produced by the area between D5, at seal 240b, and D1, at ball valve 230, pushing the seating member 225 toward the ball valve 230 and against stop 305. Pressure comes into the terminal end 225f through vent port 225h of the seating member 225 and, acts up as far as D5, at seal 240b, and against seal 240a at D4. Because the piston area between D5, at seal 240b, and D1, at ball valve 230 is greater than the piston area between D3, at seal 235b and D2, at seal 235a, the net pressure effect pushes the seating member 225 to the left and against the ball valve 230, which is given by the formula:

NET BOOST AREA TO THE LEFT=$[\pi/4[D5^2-D1^2]]-[\pi/4[D3^2-D2^2]]$

Figure 4:
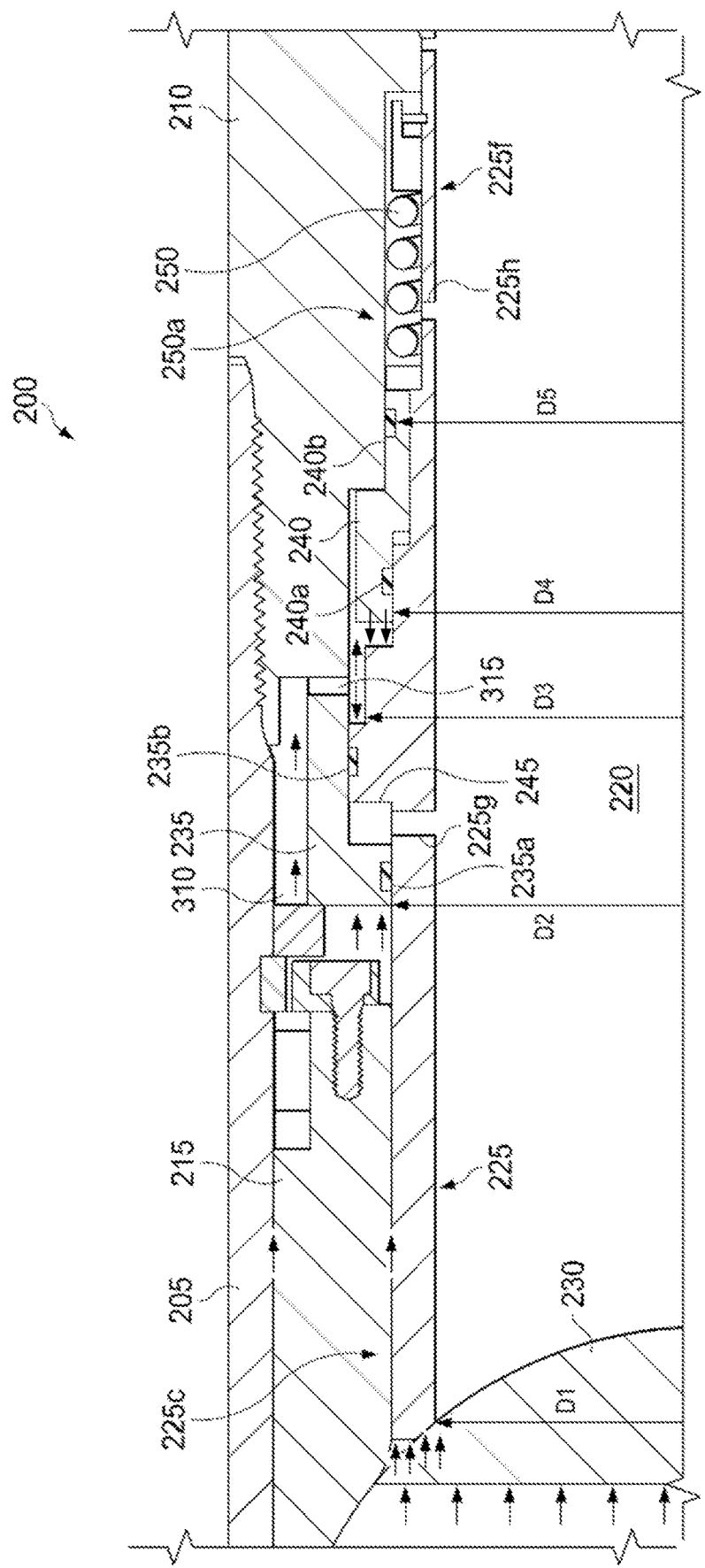
FIG. 4 is a cross section view of the embodiment of FIG. 3 illustrating the uphole pressures that can be exerted against the ball valve.

FIG. 4 illustrates the embodiment of the valve assembly 200 of FIG. 2, wherein similar components are designated with the same reference numbers. FIG. 4 illustrates the valve assembly 200 under pressure from above or uphole within passageway 220. The directional arrows illustrate pressure acting on the ball valve 230 from above and down to D1, at ball valve 230. The pressure is transmitted through the valve assembly 200, acts against the seal 235a at D2, tending to push piston 235 to the right against a stop 310. The pressure also extends through a slot 315 and acts against D3, at seal 235b. Pressure also acts against D4, at seal 240a and down to D5, at seal 240b. As the piston area between D3 and D4 is larger than the piston area between D2 and D1, the net boost effect is that the seating member 225 will, again, get pushed to the left against the ball valve 230, which is given by the formula:

NET BOOST AREA TO THE LEFT=$[\pi/4[D3^2-D4^2]]-[\pi/4[D2^2-D1^2]]$

Thus, whether the pressure comes from below or from above, the net boost piston effect is to push the seating member 225 to the left and against the ball valve 230. Another advantage is because you can vary all of the diameters D1, D2, D3, D4, D5, wherein, in certain embodiments, D1 is less than each of D2 through D5, the boost area from above and below can be configured to be exactly the same, which is difficult to do with current ball valve assemblies because such designs are restricted to a set diameter and loads from each direction is bigger than the other, for reasons noted above.

For example, in a five inch ball valve the net boost area may be about one square inch acting from a dowhhole direction against the ball valve 230. However, because embodiments of this disclosure allow the diameters to be tailored, they could be tailored in such a way as to cause the device to have a net boost area of one square inch when pressure acts from above the ball valve 230. Thus, the device could be tailored to produce the same net boost effect whether the pressure is from above or from below the ball valve. This is in stark contrast to current ball valve assemblies. Because the m-t-m seal is fixed in traditional designs and cannot be varied for reasons previously discussed, D1 cannot be varied, and thus, it is limited to where the seal points of the piston are located. As a result, such a device may produce, for example one square inch net boost effect from above, but only one and a half square inches net boost effect from below.

From the foregoing, the present disclosure provides a valve assembly that has distinct advantages over current valve assembly designs. The location flexibility of the m-t-m seat's piston which is possible along with the presence of upper and lower pistons and the vent port in the seating member allow design flexibility to lessen ball valve distortion, thereby improving m-t-m seal integrity.

The invention having been generally described, the following embodiments are given by way of illustration and are not intended to limit the specification of the claims in any manner/

Embodiments herein comprise:

A valve assembly, comprising: a valve body having a ball housing with a valve body bore there through. The ball housing is coupled to a ball housing sub-assembly. A ball valve member has a bore there through and is located in the ball housing for selective rotation between valve open and valve closed positions to control flow through the valve assembly. A seating member is slidably coupled to the valve body adjacent the valve body bore and has a metal seat located on a seating end thereof that is engagable against the ball valve member. The seating member has a vent port located there through to allow fluid to flow into a fluid chamber within the ball housing. A first piston is slidably located between the seating member and the ball housing and located over the vent port, and a second piston is slidably located between the seating member and the ball housing and is located downhole from the first piston. Sealing members are located between the first and second pistons and engaged against the seating member.

Another embodiment is directed to a well system. In this embodiment, the well system comprises a string of tubing extending into a wellbore and is connected to a valve assembly and is being supported from a rig support structure. In this embodiment, the valve body has a ball housing with a valve body bore there through that is coupled to a ball housing sub-assembly. A ball valve member having a bore there through is located in the ball housing for selective rotation between valve open and valve closed positions to control flow through the valve assembly, A seating member is slidably coupled to the valve body adjacent the valve body bore and has a metal seat located on a seating end thereof that is engagable against the ball valve member. The seating member has a vent port located there through to allow fluid to flow into a fluid chamber within the ball housing. A first piston is slidably located between the seating member and the ball housing and located over the vent port, and a second piston is slidably located between the seating member and the ball housing and being located further from the ball valve member than the first piston. Sealing members are located between the first and second pistons and engaged against the seating member.

Element 1: wherein the seating member is tubular having an inside diameter and being positioned within the valve body bore, the metal seat being located nearer the inside diameter than the sealing members.

Element 2: wherein the metal seat is located adjacent the inside diameter of the sealing member.

Element 3: wherein a portion of a length of the seating member has a first thickness that includes the metal seat and wherein a thicker portion of the seating member has a second thickness that is greater than the first thickness, the second thickness being located downhole from the first thickness.

Element 4: wherein another portion of the length of the seating member is located downhole from the second piston and has a vent port extending through the another portion, and the valve assembly further comprising a spring located within an interior spring chamber positioned downhole from the second piston and between the seating member and the ball housing sub-assembly.

Element 5: wherein the metal seat has a first diameter across the valve body bore and the sealing members each have diameters across the valve body bore and wherein the first diameter is less than each of the diameters of the sealing members.

Element 6: wherein the sealing members include: first and second sealing members associated with the first piston such that the first and second sealing members form a first set of seals between the seating member and the first piston; and third and fourth sealing members associated with the second piston such that the third and fourth sealing members form a second set of seals between the seating member and the second piston.

Element 7: wherein the metal seat has a first diameter (D1) across the valve body bore, the first sealing member has a second diameter (D2) across the valve body bore, the second sealing member has a third diameter (D3) across the valve body bore, the third sealing member has a fourth diameter (D4) across the valve body bore and the fourth sealing member has a fifth diameter (D5) across the valve body bore, and wherein D1 is less than D2, D3, D4, and D5.

Element 8: wherein D1, D2, D3, D4, and D5 can be changed to provide a net boost area that is the same when pressure is applied from above the valve assembly or from below the valve assembly.

Element 9: wherein D3 is greater than D1, D2, D4, or D5 and D5 is greater than D2 or D4.

Element 10: wherein the seating member is tubular having an inside diameter and being positioned within the valve body bore, the metal seat being located nearer the inside diameter than the sealing members.

Element 11: wherein the metal seat is located adjacent the inside diameter of the seating member.

Element 12: wherein a portion of the length of the seating member has a first thickness that includes the metal seat and wherein another portion of the seating member has a second thickness that is greater than the first thickness, the second thickness being located downhole from the first thickness where the sealing members engage the seating member.

Element 13: wherein the sealing members include: first and second sealing members associated with the first piston such that the first and second sealing members form seals between the seating member and the first piston; and third and fourth sealing members associated with the second piston such that the third and fourth sealing members form seals between the seating member and the second piston.

Element 14: wherein the metal seat has a first diameter across the valve body bore and the sealing members each have diameters across the valve body bore and wherein the first diameter is less than each of the diameters of the sealing members.

Element 15: wherein the metal seat has a first diameter (D1) across the valve body bore, the first sealing member has a second diameter (D2) across the valve body bore, the second sealing member has a third diameter (D3) across the valve body bore, the third sealing member has a fourth diameter (D4) across the valve body bore and the fourth sealing member has a fifth diameter (D5) across the valve body bore, and wherein D1 is less than D2, D3, D4, and D5.

Element 16: wherein D1, D2, D3, D4, and D5 can be changed to provide a net boost area that is the same when a pressure is applied from above the valve assembly or from below the valve assembly.

Element 17: wherein D3 is greater than D1, D2, D4, or D5 and D5 is greater than D2 or D4.

Element 18: further comprising a spring located within a spring chamber positioned downhole from the first and second pistons and between a portion of a length of the seating member and the ball housing sub-assembly, the portion of the seating member including a vent port extending there through to allow fluid into the spring chamber.

Those skilled in the art to which this application relates will appreciate that other and further additions, deletions, substitutions and modifications may be made to the described embodiments.

What is claimed is:

1. A valve assembly, comprising:
a valve body having a ball housing with a valve body bore there through, the ball housing being coupled to a ball housing sub-assembly;
a ball valve member having a bore there through and located in the ball housing for selective rotation between valve open and valve closed positions to control flow through the valve assembly;
a seating member slidably coupled to the valve body adjacent the valve body bore and having a metal seat located on a seating end thereof that is engageable against a downhole side of the ball valve member, and having a vent port located there through to allow fluid to flow into a fluid chamber within the ball housing;
a first piston slidably located between the seating member and the ball housing and being located on a same side of the ball valve member as the seating member and over the vent port;
a second piston slidably located between the seating member and the ball housing and being located on the same side of the ball valve member as the seating member and further from the ball valve member than the first piston; and
sealing members located between the first and second pistons and engaged against the seating member.

2. The valve assembly as recited in claim 1, wherein the seating member is tubular having an inside diameter and being positioned within the valve body bore, the metal seat being located nearer the inside diameter than the sealing members.

3. The valve assembly as recited in claim 2, wherein the metal seat is located adjacent the inside diameter of the seating member.

4. The valve assembly as recited in claim 1, wherein a portion of a length of the seating member has a first thickness that includes the metal seat and wherein a thicker portion of the seating member has a second thickness that is greater than the first thickness, the second thickness being located downhole from the first thickness.

5. The valve assembly as recited in claim 4 wherein another portion of the length of the seating member is located downhole from the second piston and has a vent port extending there through, and the valve assembly further comprising a spring located within an interior spring chamber positioned downhole from the second piston and between the seating member and the ball housing sub-assembly.

6. The valve assembly as recited in claim 1, wherein the metal seat has a first diameter across the valve body bore and the sealing members each have a diameter across the valve body bore and wherein the first diameter is less than each of the diameters of the sealing members.

7. The valve assembly as recited in claim 1, wherein the sealing members include:
first and second sealing members associated with the first piston such that the first and second sealing members form a first set of seals between the seating member and the first piston; and
third and fourth sealing members associated with the second piston such that the third and fourth sealing members form a second set of seals between the seating member and the second piston.

8. The valve assembly as recited in claim 7, wherein the metal seat has a first diameter (D1) across the valve body bore, the first sealing member has a second diameter (D2) across the valve body bore, the second sealing member has a third diameter (D3) across the valve body bore, the third sealing member has a fourth diameter (D4) across the valve body bore and the fourth sealing member has a fifth diameter (D5) across the valve body bore, and wherein the D1 is less than D2, D3, D4, and D5.

9. The valve assembly as recited in claim 8, wherein D1, D2, D3, D4, and D5 provide a net boost area that is substantially the same when a pressure is applied from above the valve assembly or from below the valve assembly.

10. The valve assembly as recited in claim 8, wherein D3 is greater than D1, D2, D4, or D5 and D5 is greater than D2 or D4.

11. A well system, comprising:
a string of tubing extending into a wellbore and connected to a valve assembly and being supported from a rig support structure, the valve assembly comprising:
a valve body having a ball housing with a valve body bore there through, the ball housing being coupled to a ball housing sub-assembly;
a ball valve member having a bore there through and located in the ball housing for selective rotation between valve open and valve closed positions to control flow through the valve assembly;
a seating member slidably coupled to the valve body adjacent the valve body bore and having a metal seat located on a seating end thereof that is engageable against a downhole side of the ball valve member, and having a vent port located there through to allow fluid to flow into a fluid chamber within the ball housing;
a first piston slidably located between the seating member and the ball housing and being located on a same side of the ball valve member as the seating member and over the vent port;
a second piston slidably located between the seating member and the ball housing and being located on a same side of the ball valve member as the seating member and further from the ball valve member than the first piston; and
sealing members located between the first and second pistons and engaged against the seating member.

12. The well system as recited in claim 11, wherein the seating member is tubular having an inside diameter and being positioned within the valve body bore, the metal seat being located nearer the inside diameter than the sealing members.

13. The well system as recited in claim 12, wherein the metal seat is located adjacent the inside diameter of the seating member.

14. The well system as recited in claim 11, wherein a portion of a length of the seating member has a first thickness that includes the metal seat and wherein a thicker portion of the seating member has a second thickness that is greater than the first thickness, the second thickness being located downhole from the first thickness.

15. The well system as recited in claim 14, wherein the sealing members include:
first and second sealing members associated with the first piston such that the first and second sealing members form seals between the seating member and the first piston; and third and fourth sealing members associated with the second piston such that the third and fourth sealing members form seals between the seating member and the second piston.

16. The well system as recited in claim 15, wherein the metal seat has a first diameter across the valve body bore and the sealing members each have diameters across the valve body bore and wherein the first diameter is less than each of the diameters of the sealing members.

17. The well system as recited in claim 15, wherein the metal seat has a first diameter (D1) across the valve body bore, the first sealing member has a second diameter (D2) across the valve body bore, the second sealing member has a third diameter (D3) across the valve body bore, the third sealing member has a fourth diameter (D4) across the valve body bore and the fourth sealing member has a fifth diameter (D5) across the valve body bore, and wherein D1 is less than D2, D3, D4, and D5.

18. The well system as recited in claim 17, wherein D1, D2, D3, D4, and D5 can be changed to provide a net boost area that is substantially the same when a pressure is applied from above the valve assembly or from below the valve assembly.

19. The well system as recited in claim 17, wherein D3 is greater than D1, D2, D4, or D5 and D5 is greater than D2 or D4.

20. The well system as recited in claim 14, wherein another portion of the length of the seating member is located downhole from the second piston and has a vent port extending there through, and the valve assembly further comprising a spring located within an interior spring chamber positioned downhole from the second piston and between the seating member and the ball housing sub-assembly.

* * * * *

UNITED STATES PATENT AND TRADEMARK OFFICE
CERTIFICATE OF CORRECTION

PATENT NO. : 11,448,326 B2
APPLICATION NO. : 16/927563
DATED : September 20, 2022
INVENTOR(S) : Michael Adam Reid It is certified that error appears in the above-identified patent and that said Letters Patent is hereby corrected as shown below:

On the Title Page

After:
"Prior Publication Date
US 2021/0080012 A1 Mar. 18, 2021"
Insert item (30):
--Foreign Application Priority Data
Sept. 17, 2019 WO ............PCT/US2019/051408--

Signed and Sealed this
Twenty-fifth Day of November, 2025

John A. Squires
*Director of the United States Patent and Trademark Office*